Jan. 7, 1930.   C. KINSLEY   1,743,087
METHOD OF AND APPARATUS FOR MAGNETIC TESTING
Filed Feb. 27, 1928   2 Sheets-Sheet 1
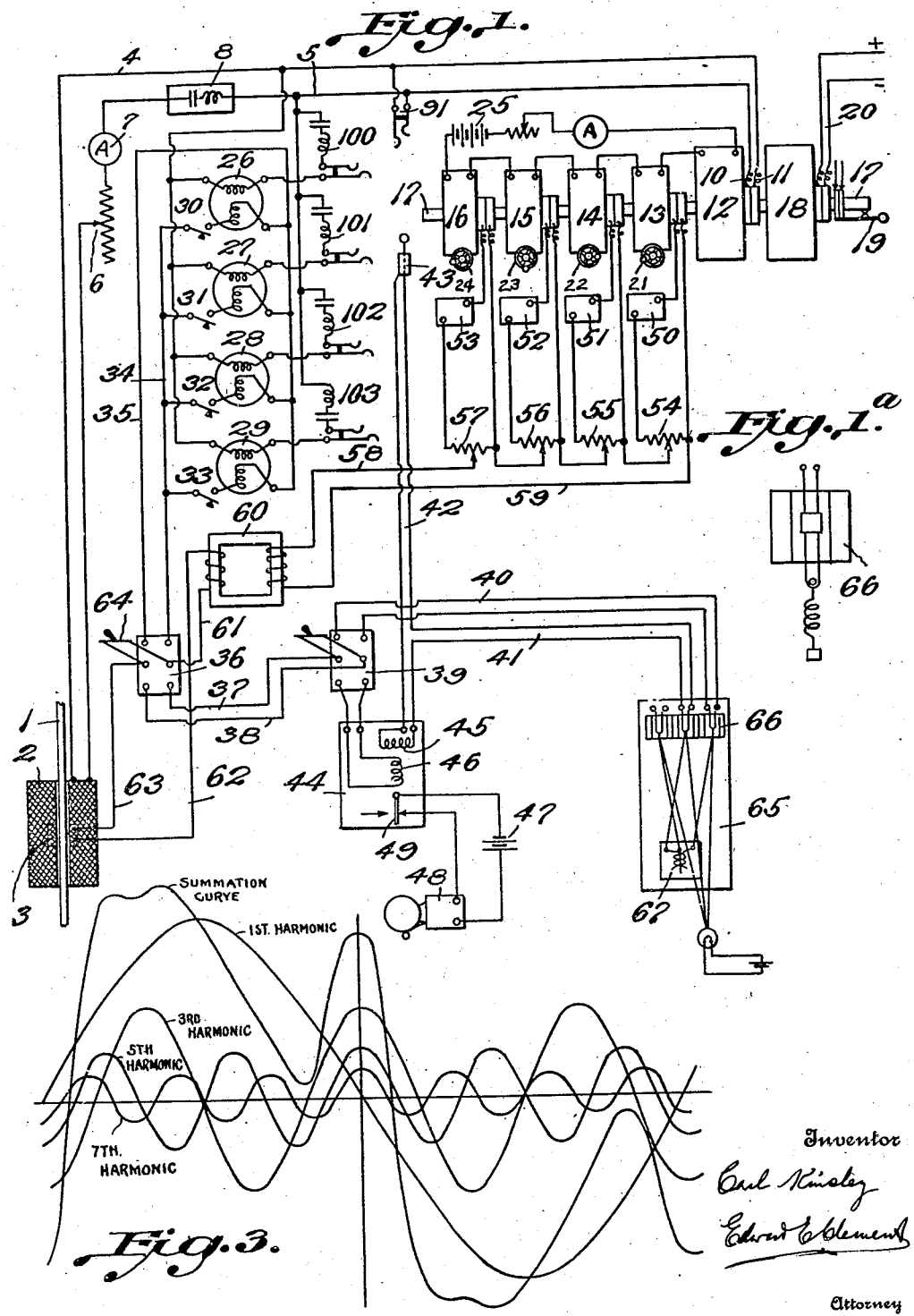

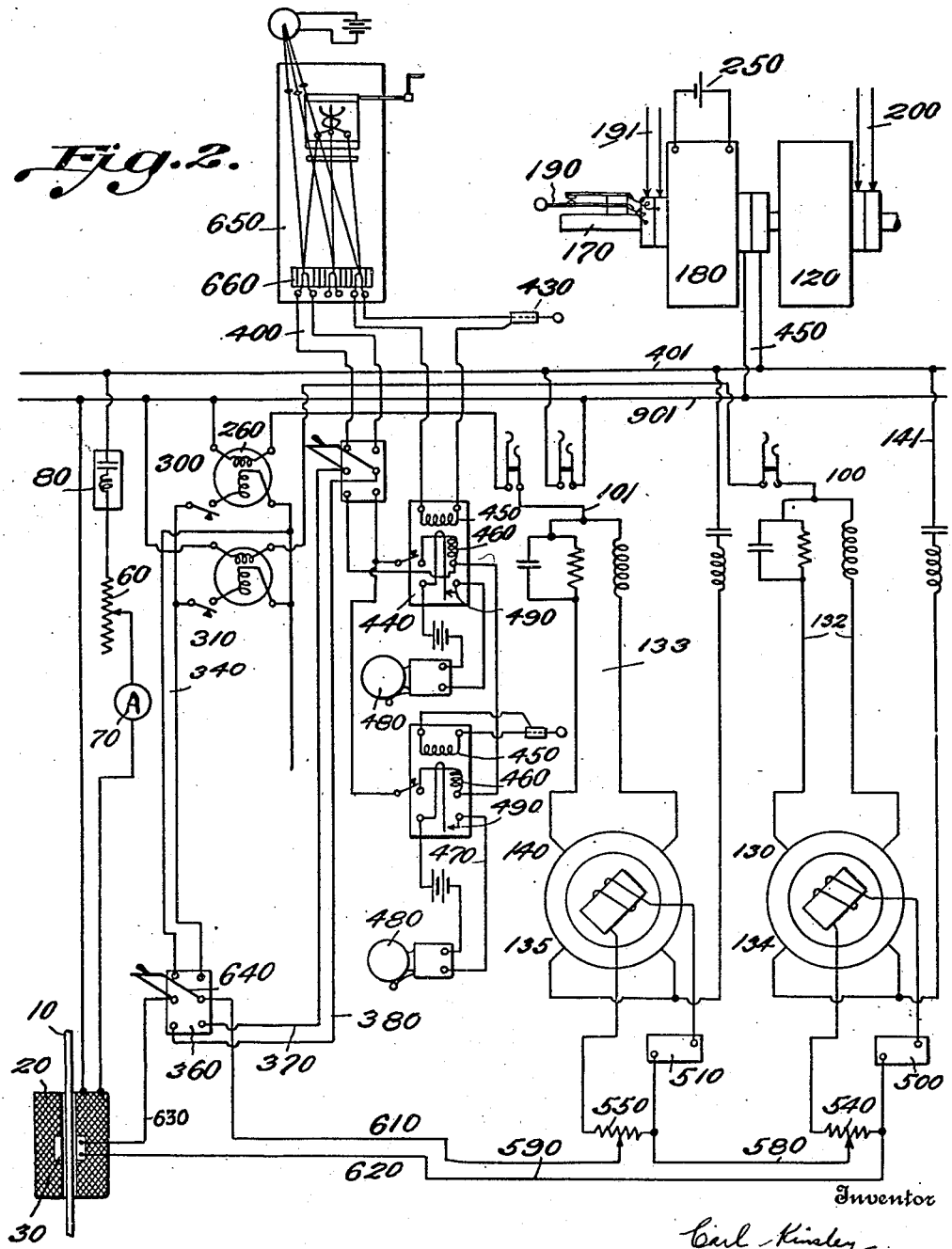

Patented Jan. 7, 1930

1,743,087

UNITED STATES PATENT OFFICE

CARL KINSLEY, OF SCARSDALE, NEW YORK

METHOD OF AND APPARATUS FOR MAGNETIC TESTING

Application filed February 27, 1928. Serial No. 257,295.

My invention relates to the art of magnetic testing, and has for its object the improvement and simplification of methods heretofore in use including those described in my prior applications, Serial No. 170,195, filed February 23, 1927, and Serial No. 254,388, filed February 15, 1928. In order to attain my object, I may say at the outset that I have produced a new method, by means of which certain objectionable factors have been largely eliminated, such as the effect of temperature changes, and the operation at the same time has been rendered more uniform and more reliable than heretofore possible. The general principle employed in all magnetic testing, of detecting variations in the characteristics of metal under test by means of corresponding variations in the magnetic flux, remains the same. Chemical composition, methods of production, subsequent heat treatment and manufacturing operations, all play roles of primary importance in determining the final structure and physical constants of every form of steel. It has been found that, even with the greatest care in production, no two pieces of steel are identical. The changes, moreover, are of such great importance that a high figure of safety must be used while one of only one half of the value could be employed with equal safety if there could be made available a satisfactory method of non-destructive testing.

It has been found by experiment that two pieces of steel, which differ in their chemical, metallurigical or physical properties, when subjected to the same cycle of magnetizing force will have resulting cycles of magnetic flux which are never the same. It is assumed that the converse would be equally true if two identical cycles of magnetic flux were ever found with two pieces of steel. Within commercial limits, any significant difference in the above characteristics of steel will be marked by corresponding significant differences in the magnetic fluxes. A general statement can be made, as follows: Any combination of chemical, metallurgical and physical properties in a piece of steel will produce a unique relation between the cycle of magnetic force, to which the steel is subjected, and the resulting cycle of magnetic flux. Conversely, any unique relation between a cycle of magnetic force and the resulting cycle of magnetic flux will be found with one and only one combination of chemical, metallurgical and physical properties in a piece of steel.

It is, in most cases, impossible to make a change in only one property at a time in a piece of steel and so the correlation of the properties with the magnetic measurements is difficult. A great simplification has been accomplished, however, by the means to be hereafter disclosed, so that in certain cases the exact correlation has been obtained and in many cases, within commercial limits, it is already possible to determine with exactness the properties possessed by the steel after finishing the manufacturing operations.

The importance of non-destructive methods of testing metals as an adjunct to our present industrial technique, cannot be overestimated and the importance of any method which eliminates a source of error therein is proportionately great. In order to attain my present object, I make use of certain principles heretofore generally employed, but have discarded one principle, viz.: that of balancing a piece under test against a standard, and in place thereof have substituted a synthesized electrical wave which can be built up either with reference to a temporary or permanent standard, or according to theoretical requirements, and use this wave in conjunction with the usual sine wave energizing current to produce inductive or reactive effects varying with the characteristics of the steel under test, and which may be measured or recorded. The greatest single advantage in this method lies in the possibility of producing variations at will in the synthetic wave. Thus, for example, this wave may be composed of a fundamental or first harmonic, and the third, fifth and seventh harmonics, all of which are pure; and if conditions require it one or more of the harmonics may be cancelled or strengthened, or other changes produced therein which afford perfect flexibility in the testing operation to meet all requirements.

If a steel bar is subjected to a magneto-motive force which is a sine function then the resulting magnetic flux is not a simple sine function but is compounded of a series of simple sine functions, if the irregular curve is analyzed into a Fourier's series. This has been done for many cases and it has been found that under the conditions existing in normal practice the series contains only the odd terms and that with moderate magnetizing forces the harmonics above the first have small amplitudes. It is usual to take the derived curve of $e_2 = k\frac{dB}{dt}$ or the current curve $i_2 = \frac{e_2}{R}$ which has the same harmonics present. It is possible therefore to use the current curve, $i_2$, as the means for analyzing the sample of steel. No completely satisfactory method for neutralizing the unimportant parts of the curve and for amplifying the small significant differences which distinguish the variations existing between two pieces of steel, has heretofore been found.

My invention consists in employing a combination of circuits which enables me to add to the secondary circuit a combination of electro-motive forces having their frequency, phase and amplitude so adjusted as to balance out the portion of the secondary E. M. F., $e_2$, in which I am not interested, consequently, enabling me to use sensitive instruments or amplifying circuits which will enable me to observe and use in relays or recording instruments the small significant differences which characterize the different steels.

I have shown two ways in which this purpose can be accomplished but I am not limited to those two means which merely serve to illustrate the general method which is claimed in this application.

My invention is illustrated in the accompanying drawings, which show certain forms of apparatus useful in practicing my new method, and which also contain novel features of construction, which I shall claim accordingly.

In the drawings, Fig. 1 is a diagram showing a system of circuits in which a single primary coil is fed with sine wave energizing current, the secondary coil associated therewith is supplied with a synthetic wave, and the material under test is passed through both coils to produce inductive effects which in turn produce a sensible indication to show the characteristics of the sample from point to point.

Fig. 1ᵃ is a detailed view of one unit of an oscillograph, with a torsion mirror and field coil.

Fig. 2 is a diagram of a modified system in which a single primary and a single secondary are employed as before, but certain changes are made in the apparatus for shifting the phase of the harmonics of which the synthetic wave is composed.

Fig. 3 is a diagram showing the characteristics and composition of the summative current produced in testing.

Referring to Fig. 1, 1 indicates a body of magnetizable material, such as iron or steel strips, bars, rods, cables, or other elongated units, which, for the purpose of the present invention and in the specific form shown, is supposed to be passed through, and as it passes, to form the core of, a primary magnetizing coil or solenoid 2, with which is associated a secondary coil 3. The coil or solenoid 2 receives energizing current through a circuit 4—5 which is connected through a variable resistance 6, ammeter 7 and filter 8, to the brushes 10 of a generator 12, the moving element of which is carried on a shaft 17 driven by a suitable motor 18, which in turn receives its power current through a circuit 20 leading to any suitable power source. While the nature of the power current is immaterial, the output of the generator 12 is an alternating current which by means of the filter 8 is fed to the coil 2 as a sine wave current of a frequency which depends on the nature of the work to be done. In the specific character of work which I shall describe in connection with this figure, a suitable frequency would be 20 cycles per second, but this may be varied, as will presently appear.

The secondary coil 3 has impressed upon it, through circuit 62—63, an alternating electromotive force, and carries a resultant current which I shall designate herein as a synthetic wave, derived from a complementary set of generators 13—14—15—16, the armatures of which are mounted upon the same shaft 17, which carries the armature of the generator 12. The currents generated by the elements 13—14—15—16 are related to the primary current generated by the element 12 as harmonics, the primary output being regarded as the fundamental or first harmonic of the series, the output of the first element 13 being also the first harmonic or fundamental. Each of the machines 13—14—15—16 is provided with suitable means for adjusting the phase of its current with respect to the phase of the primary current. Such phase adjusters are well known in the art, and may conveniently consist of adjustable fields controlled by means of the worm gears and hand wheels indicated at 21—22—23—24. The output circuits of the machines 13—14—15—16 pass from the brushes of the machines through filters 50—51—52—53 and adjustable resistances 54—55—56—57 connected in series in the composition circuit 58—59, which feeds a primary winding of the transformer 60, the secondary of which is connected through circuit 61 to the circuit 62—63 of the secondary coil 3.

In order to permit of calibration, a double-pole double-throw switch 36 is included between the circuit 61 and 62—63. When this switch is closed on the upper contacts, a synthetic wave due to the generators 13—14—15—16 is fed through the transformer 60 directly to the coil 3 through the circuit 62—63, and a set of voltmeters 26—27—28—29 is also connected to the circuit 61. When the switch on 64 is thrown down onto the lower contacts, the voltmeters are disconnected and the synthetic wave circuit 61, which is also the circuit of the coil 3, is connected through wires 37—38 to a signal and recording device. The voltmeters 26—27—28—29 are not permanently connected and are not in parallel, but are provided with push buttons or other suitable connecting devices 30—31—32—33 whereby one at a time may be thrown across the circuit 61. Each of these voltmeters is adapted particularly to one of the harmonic frequencies produced by the generators 13—14—15—16, one element of each voltmeter being permanently connected through a filter and jack in series to the output circuit of generator 12 which gives an impure wave containing harmonics of the same frequencies as the generators 13—14—15—16, and the other element going to the circuits 34—35.

The feed circuit from the generator 12 to each voltmeter is provided with a suitable filter as shown at 100, 101, 102 and 103, so that only the particular harmonic frequency corresponding to the particular voltmeter will be fed thereto. In determining the character of the synthetic wave in any particular case, three factors require adjustment, viz: the frequency, which is regulated by means of the shaft 17, the phase, which is determined by adjustment of the field as already mentioned, and the amplitude, which is determined by means of the resistances 54—55—56—57.

The signal and recording devices connected to circuit 37—38 are shown as including an audible signal such as a bell 48, and an oscillograph 65. The bell or its equivalent 48 is a convenient means for giving notice of the occurrence of certain changes in the characteristics of the material under test, while the oscillograph is used to continuously record such changes, producing a representation thereof on a translucent plate or on a photographic film in a manner well understood in the art. When the switch 39 is closed on its lower contacts, the coil 46 of a relay 44 is connected to the circuit 37—38, while the coil 45 of the same relay is permanently connected through circuit 42 to a suitable switching device such as plug 43, by which it may be connected to any one of the harmonic filter circuits 100—101—102 or 103. The movable element or armature 49 of the relay 44 is included in circuit 47 of the audible signal 48. Thus with the switch 39 closed on its lower contacts as stated, the signal will be made responsive to changes in the magnetizable body which in turn produce changes through the secondary coil 3 in the composite circuit 37—38 with particular reference to the harmonic corresponding to the particular circuit 100—101—102—103 with which the coil 45 is for the moment connected.

The magnetizable body 1 may be fed through the coils 2 and 3 at any speed from zero to the maximum at which accurate observations are possible, and the current in the composite circuit 37—38 is due to composition of the electromotive force induced through the transformer by the synthetic wave derived through circuit 58—59 from the harmonic generators and the electromotive force induced in coil 3 by the changes in the flux through the body being tested. Since the primary energizing current in circuit 4—5 is constant, these changes in the magnetizable body may be observed and measured by changes in the current in the composite circuit 37—38.

Each voltmeter 26—27—28—29 has its own harmonic circuit, and it should be observed that the last instrument 29 corresponds with the first harmonic frequency produced by generator 13, which is the fundamental. Thus observations can be taken at any of these frequencies. It should also be observed that while I have shown the relay coil 45 terminating in a plug for connection to any one of the harmonic filter circuits 100—101—102—103, it might also be connected to an alternating current circuit having a wave form compounded of a series of harmonics such as for instance would be the case if the jack 91 were connected across the terminals of the generator 12 instead of being put in series with the filters.

With the switch 39 closed on its upper contacts, the composite circuit 37—38 is extended through circuit 40 of the element 66 of the oscillograph 65. The machine which I have chosen to illustrate is of the type known as the General Electric oscillograph, wherein the mirror-carrying element lies in a magnetic field and is moved by changes in the current passing through it. Any other suitable form of oscillograph may be substituted, as I am not limited to specific apparatus in the practice of my invention. The record of the oscillograph in this case is made upon a film 67 or equivalent photographic paper. It is to be understood that the oscillograph may be used and is used for purposes of observation alone, without the photographic record.

In order to insure a constant frequency for each of the generators 12—13—14—15—16, all of which are driven by the same shaft 17, I use a governor of convenient form, illustrated as a ball governor of known type 19.

The operation of the system thus described is as follows:

The shaft 17 is driven at a constant speed and the generators 12—13—14—15—16 produce currents of constant frequency as already stated, the fundamental current used as the primary energizing current for the coil 2 passing direct from the generator 12 through the circuit 4—5, and all of the harmonic generators 13—14—15—16 being connected in series to the circuit 58—59. A sample 1, of known characteristics, being inserted in the coils 2—3, is magnetized by the current flowing in the circuit 4—5, which is assumed to be a pure sine wave current. With the switch 36 thrown down onto its lower contacts, and the switch 39 thrown up to connect the oscillograph, current flowing in the circuits 62—63 and 37—38 will not be a sine wave current, but will be a composite current, due to the synthetic wave in circuit 58—59 and the inductive effects produced through the coil 3. If the synthetic wave be removed, as for example by opening the circuit 58—59, the current in the circuits traced will vary from a sine wave current in certain particulars corresponding to the known characteristics of the sample 1. In such case the oscillograph will show two curves, one due to the pure sine wave current, and the other due to the induced current. The significant differences are only slight variations from a sine wave, and if the other portions of the wave be neutralized the significant differences can be amplified so as to be capable of accurate analysis and available for the characterization of the sample.

It is in order to neutralize the characteristic differences which are unimportant for particular factors that I employ my new principle of a synthetic wave. Assuming the circuit 58—59 to be closed again, the harmonic frequencies produced by generators 13—14—15—16 may be adjusted in the particulars hereinbefore recited, that is to say, as to phase relation and amplitude, so that in the composite circuit 37—38, the current will be such as to produce a wave in the oscillograph that correctly and accurately represents changes alloted to certain characteristics which are those particularly necessary to observe. The same end may be attained by use of the voltmeters in the following manner: Each voltmeter separately, as for instance 29, is connected to the generator 12 through its own filter such as 103, and also by means of the switch 33 is connected to the composite circuit including the secondary of the testing coil. If now the voltmeter gives a deflection with its connection to the variable resistance 54 adjusted to impress an electromotive force of its frequency upon the synthetic circuit 58—59, then the phase of said electromotive force should be changed by the adjuster until the deflection of the voltmeter is at a maximum. The phase of the harmonic induced in the secondary is then known to be the same as the phase of the same frequency impressed on the circuit 62—63 by the generator 13. The phase of the generator in the synthetic circuit can now be changed by 180°, and then the resulting deflection of the voltmeter gives the difference between the two circuits, which in general will not be zero. Thereupon change the electromotive force impressed upon the circuit by changing 54 until the deflection of the voltmeter is zero, and then we will know that the electromotive force from the generator 13 will be the same as the electromotive force from the secondary of the testing coil in both amplitude and phase. This being accomplished, the same steps are then performed with the next voltmeter in order, and so on until all of the components present have been neutralized. In general for commercial purposes the number shown will be sufficient. I do not limit myself to that number since in specific cases I may want to go to still higher frequencies than those shown. Ordinarily, the use of the oscillograph in the neutralizing operation is merely supervisory, but for commercial purposes is frequently sufficient. Thus, for example, if a certain variation suggests the neutralization of the third harmonic, this is done and the result is an approximation sufficiently close for ordinary work.

Thus far the operation has been with a known specimen, in order to adjust the factors controlling the characteristics of the synthetic wave and the consequent neutralization to be effected thereby. In other words, the composition of the synthetic wave is determined, and it is rendered available for use with unknown samples. The known sample 1 is now replaced by the sample to be tested. There will at once be a slight variation from the previous result which can be amplified until an exact quantitative measurement of the difference can be made.

The next step is to determine the particular characteristic features of the curve thus produced, which by experience I know corresponds to certain charactertistics of the sample under test, and again I can neutralize the harmonics present which are not significant in respect to factors under consideration and further amplify the characteristics appertaining to said factors. This can be done either with the voltmeters or in a visual way as already described with the oscillograph, then throw over the circuit by means of the switch 39 to the relay 44, and proceed with the test. The coil 45 of the relay can be connected either to a pure harmonic circuit by plug 43 to the jacks of the filter 100—101—102—103, or through the jack 91 to the composite circuit of generator 12. The other coil 46 being connected through switch 39 to the composite circuit 37—38 (which carries a current whose form is due to the synthetic wave combined with the induced current from coil 3), I then cause the relay to respond either to variations in one pure harmonic or to variations in all the harmonics. With this condition established, the sample 1 under test is then moved from point to point through the coils and the relay adjusted so as to indicate whenever the variations exceed a predetermined amount. With the apparatus shown, the result is that when excessive variations occur, due to objectionable changes in the characteristics of the sample under test, the bell 48 will ring or other indication be given, whereupon the sample can be marked or the condition observed may be otherwise recorded.

It has been found that in bodies of steel and iron changes in the characteristics frequently occur in cycles due to some cycles in the mill operations. Experience soon enables a test to be made in corresponding cycles where changes in the structure may be expected to occur. I am not limited to such operation, however, nor in fact to any particular rate or kind of movement of the sample, which within certain limits may be anything desired. If the sample is maintained stationary with energizing current flowing through the coil 2, it will be noted that the eddy currents which are always present in the metal will produce corresponding heat effects, and until an equilibrium is established this will interfere with the accuracy of the observations. With this temperature equilibrium established, it is then possible to readjust the synthetic wave factors so as to again produce the same balance. This is impossible of attainment with older methods in which a standard is employed.

Referring now to Fig. 2, except as otherwise specified, the parts in this figure are designated by the same numerals as the corresponding parts in Fig. 1, but with a decimal place added. The primary coil in this case is marked 20, the secondary coil 30, the composite circuit 610—620, and the harmonic selectors and phase adjusters are marked 130—140. The first of these represents the fundamental and the second the third harmonic, but of course more may be added if desired. The driving motor is marked 120, and a single primary generator 180 is employed on the driven shaft 170, provided with a governor 190 and speed control circuit 191. The exciting circuit for the field of the generator is indicated by 250 and the power circuit at 200. Feed circuit 450 extends from the brushes of the generator 180 to the primary circuit 40—50 of the testing system. The primary coil 20 is fed from this circuit with a sine wave current, as determined by the filter 80 and the adjustable resistance 60. The voltmeters 260—270 are shown connected on one side to the harmonic selector circuits respectively and on the other side through the circuit 340 and the switch 360 to the composite circuit 610—620, containing the secondary coil 30.

The circuit 370 passes to the double-pole double-throw switch 390, by which it may be connected with either the relays 440 or the oscillograph 650. The connections and character of all these parts are substantially the same as in Fig. 1, transformer 60 being omitted, however, and the composite circuit 610—620 receiving its synthetic wave directly from the selective circuits 130—140. The current generated by the alternator 180 is impure, containing beside the fundamental all the necessary harmonics for my purpose. This current feeds through the circuit 401—501 to the harmonic selectors, which include branch circuits 131—141, and so to the phase adjusters, and thence through the tuned branches 132—133 and circuits 100—101 to the corresponding relays 440 and the voltmeters 260—270 and thence back to the circuit wires 141—501. The phase adjusters are specifically marked 134—135 and the circuits 132—133 are tuned for their respective harmonic frequencies. By means of the phase adjusters, therefore, the phase angle of the current may be adjusted not only with respect to the circuit 610—620, but also with respect to the relay 440 and the voltmeter 260—270. The output circuits of the harmonic selectors are connected to the synthetic wave circuit 580—590 through filters 500—510 and adjustable resistances 540—550, the connection being in series so that at all times a synthetic wave is fed into the circuit 610—620, composed of harmonics adjusted as to their phase and amplitude as in Fig. 1.

The operation of this modified system is substantially the same, and the results are the same, as already described in connection with Fig. 1. The body of metal 10 is placed in position within the coils 20—30, the switch 360 is closed on its upper contacts, and one after the other the voltmeters 260—270 are cut in, while adjustment of the phase angle and amplitude of the respective corresponding harmonic currents is made. In the meantime, the primary coil 20 is energized as befor through the circuit 401—501, the filter 80 and the adjustable resistance 60, so that by induction through the coil 30 a current is produced in the circuit 610—620 which is not a sine wave but varies from the initial sine wave in coil 20 in particulars determined by the characteristics of the metal body 10. The phase angle and amplitude of the component harmonics having been adjusted, the piece 10 is removed, and the body to be tested is placed in the coil 20. It is to be noted in this case as in the case of Fig. 1 that the trial piece 10 first employed is not in any sense a standard, but is employed merely for convenience in obtaining an approximation of the final settings for adjustment of the phase angle and amplitude of currents in the harmonic selector circuits. When the piece to be tested is substituted, its characteristics being different, there will be a variation, and the harmonic selectors require further adjustment to neutralize those portions of the resultant curve which are not of importance in the test and enable us to accentuate those which are of importance.

Increased sensitivity of the apparatus can then be obtained by either mechanical adjustment or adjustment of electrical constants. Such adjustment might for example be accomplished by loosening the spring of the oscillograph, or by increasing the current flow in the electrical circuit thereof. In the case of a shunt on the relay or other instrument the shunt resistance can be readily adjusted. Such expedients are well known in the art and need no description.

The final adjustments having been made, the test may proceed as before, either with the oscillograph or with the relays and sensible signaling devices 480. The type of relays and signals is shown the same here as in Fig. 1 and the operation is the same.

In both Figs. 1 and 2 the coils 45 and 450 respectively are connected or adapted to be connected so as to take one harmonic frequency at a time either from filter circuit 100—103 or from the frequency selectors 132—133 of Fig. 2.

I have shown in Fig. 3 curves representing four of the harmonics present in the current from the generator 12 which, through the jack 91 and circuit 42, will enable the coil 45 of the relay 44 to be energized at the plurality of frequencies, so that, responsive to the composite wave from circuit 37—38 in the movable coil 46, the relay will have simultaneously acting on its movable system quadruple torque which can be adjusted for controlling the sensible indicating devices by changing the components of the synthetic wave in circuit 58—59 at will and increasing or depressing independently each of the torques imposed on the relay.

In Fig. 2 the same control is exercised over relay 440 and the plurality of torques is imposed on the movable coil when the plug 430 is inserted in jack 910, but when jack 101 or 102 is used, then the relay is responsive to the torque due only to the particular harmonic in the particular filter circuit to which the coil 450 is connected.

What I claim is:

1. The method of testing a magnetizable body which consists in establishing a magnetic flux in said body, and causing the same to affect a circuit carrying a synthetic wave of definite and predetermined characteristics and producing a sensible indication of amplitude variations in the resultant cycles of the summative current due thereto.

2. The method described in claim 1, in which the magnetic flux in the magnetizable body is produced by a sine wave current of fixed and determinate characteristics.

3. The method described in claim 1, in which the synthetic wave is produced by combining harmonics of the fundamental frequency of the current producing the magnetic flux in the body under test.

4. The method described in claim 1, in which the magnetic flux in the body under test is produced by a sine wave current of fixed and determinate fundamental frequency, and the synthetic wave is composed of harmonics thereof.

5. The method described in claim 1, in which the magnetic flux in the body under test is produced by a primary circuit, and the synthetic wave is carried in a secondary circuit in inductive relation thereto.

6. The method described in claim 1, in which the magnetic flux in the body under test is produced by a primary coil and the synthetic wave is caused to circulate in a secondary coil in inductive relation thereto.

7. The method of testing described in claim 1, in which the synthetic wave is first checked against a piece of metal similar to that to be tested, to establish the correct functioning of the circuits, and thereafter changes are made in the amplitude and phase of the components of the synthetic wave such as will enable the presence of particular characteristics in the material under test to be recognized.

8. The method of testing described in claim 1, in which the resultant cycles of the summative current are selectively affected for test purposes by adjustment of the characteristics of the respective harmonic components of the synthetic wave.

9. The method of testing described in claim 1, in which the resultant cycles of the summative current are varied by neutralizing those components of the composite wave which are not significant in the test.

10. The method of testing described in claim 1, which consists in adjusting the components of the synthetic wave to produce resultant cycles of summative current from which the unimportant characteristics have been removed, and thereafter causing any variation in said current in excess of a predetermined maximum to operate a signal device and give a sensible indication.

11. The method of testing described in claim 1, in which the individual harmonics composing the synthetic wave are selectively employed to operate the sensible indicating device.

12. In a testing system, means for generating a fundamental frequency and one or more harmonics thereof, a primary coil and a secondary coil, with means to feed current of the fundamental frequency to said primary coil, a composite circuit, means to feed induced current from said secondary coil to said composite circuit, and means to feed a synthetic wave composed of said fundamental and harmonics into said composite circuit, together with a sensible indicating device responsive to variations in the resultant cycles of the summative current in the composite circuit corresponding to selected variations in said induced current.

13. In a testing system, means for magnetizing the body under test, means for producing thereby a secondary current containing variations due to characteristics of the body under test, means for combining therewith a synthetic wave composed of predetermined frequencies, and means for producing sensible indications of predetermined variations in the resultant current.

14. In a testing system, a primary magnetizing circuit and a source of supply therefor of a determinate frequency, a secondary circuit in inductive relation to said primary and adapted to be affected by the body under test, means for generating harmonics of the primary supply frequency and means for supplying a synthetic wave composed thereof to said secondary circuit, means for initially adjusting the relation between the induced and synthetic waves in the secondary circuit, and means for thereafter detecting variations due to variable characteristics in the body under test and exceeding a predetermined maximum.

15. In a testing system as described in claim 14, means for detecting current variations comprising one coil connected to said secondary circuit and a second co-operating coil adapted to be connected to said means for generating harmonics so as to receive one or more of said harmonic frequencies, together with signaling means actuated in the co-operation of said coils.

In testimony whereof I hereunto affix my signature.

CARL KINSLEY.